United States Patent

[11] 3,585,376

| [72] | Inventor | Esteban J. Toscano<br>Tarzana, Calif. |
|---|---|---|
| [21] | Appl. No. | 770,673 |
| [22] | Filed | Oct. 25, 1968 |
| [45] | Patented | June 15, 1971 |
| [73] | Assignee | Hughes Aircraft Company<br>Culver City, Calif. |

[54] POSITIONING SYSTEM
9 Claims, 6 Drawing Figs.

[52] U.S. Cl. .................................................. 235/151.11,
235/92 EC, 318/563
[51] Int. Cl. ........................................................ G06f 15/46,
G05b 19/18
[50] Field of Search .......................................... 235/151.11,
92; 318/18, 563, 572

[56] References Cited
UNITED STATES PATENTS

| 2,886,717 | 5/1969 | Williamson et al. | 235/92 X |
| 3,228,021 | 1/1966 | Lehmer | 235/92 X |
| 3,383,499 | 5/1968 | Laidlaw | 235/92 |
| 3,491,278 | 1/1970 | Stobbe | 235/151.11 X |

*Primary Examiner*—Malcolm A. Morrison
*Assistant Examiner*—Charles E. Atkinson
*Attorneys*—James K. Haskell and E. F. Oberheim

ABSTRACT: A positioning system for either incremental or absolute positioning applications in which a count pulse train is generated during positioning movement and a correction pulse is generated at one or more predetermined points along the path of movement and effectively added to or subtracted from the count pulse train, depending upon whether the member being positioned is predetermined to be beyond or behind the point indicated by the number of pulses of the count pulse train.

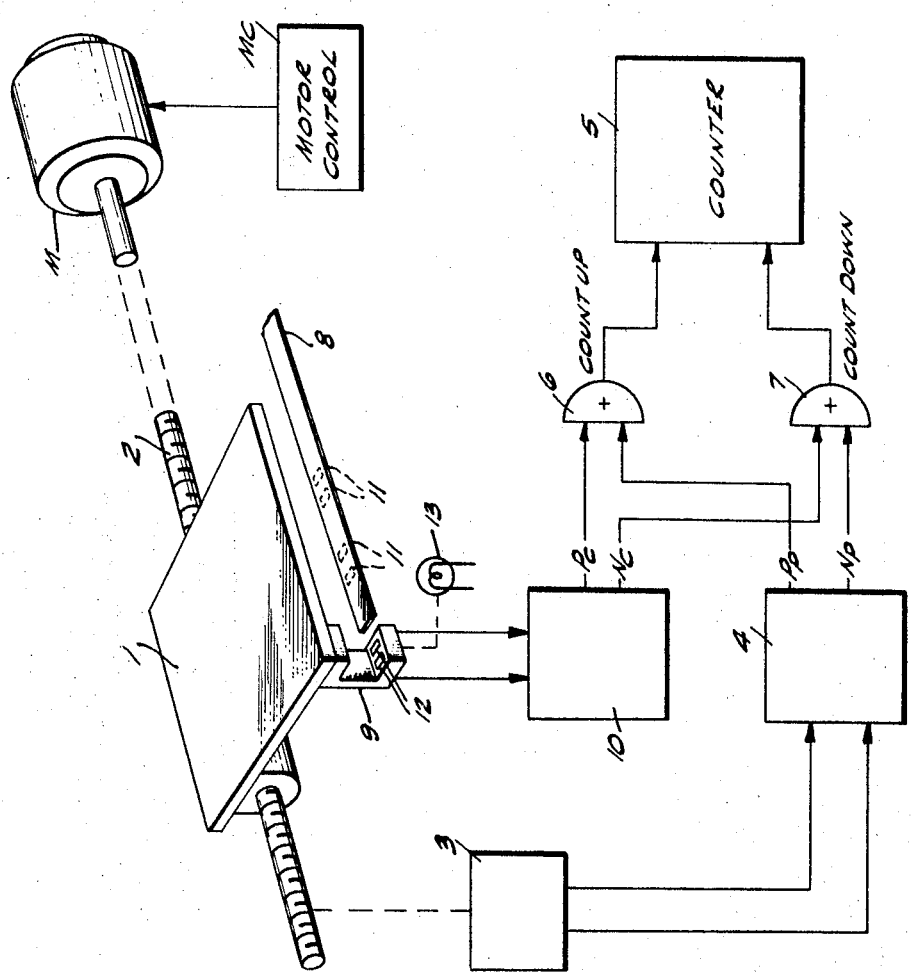
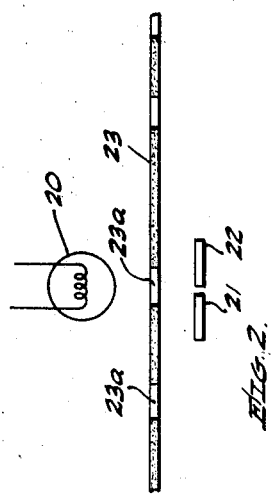

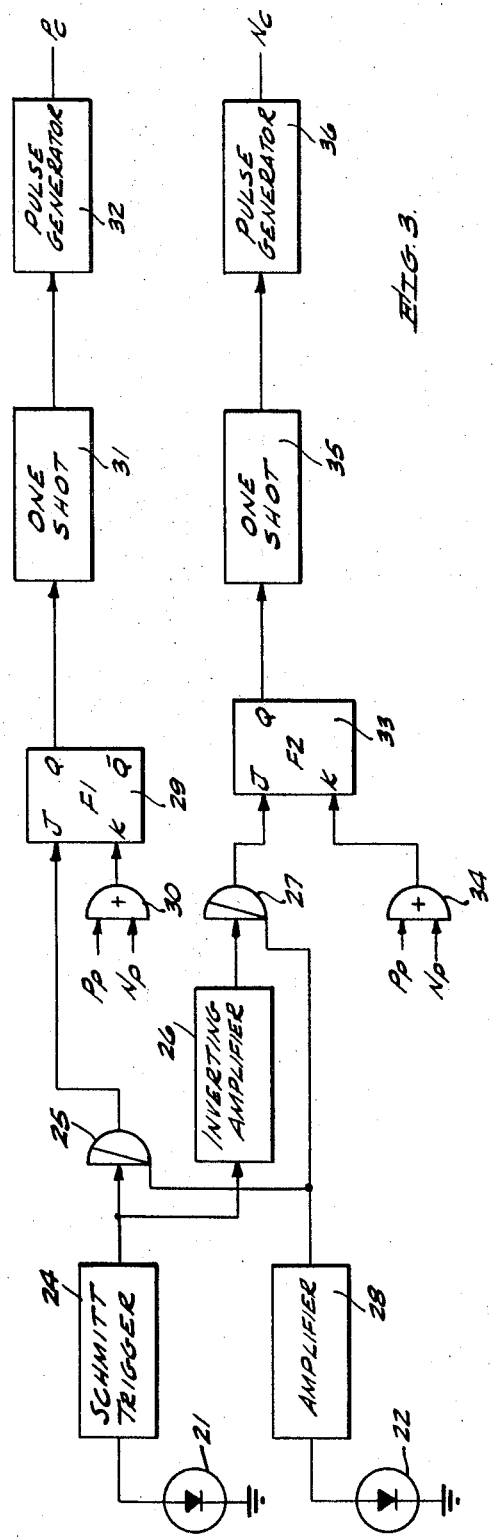
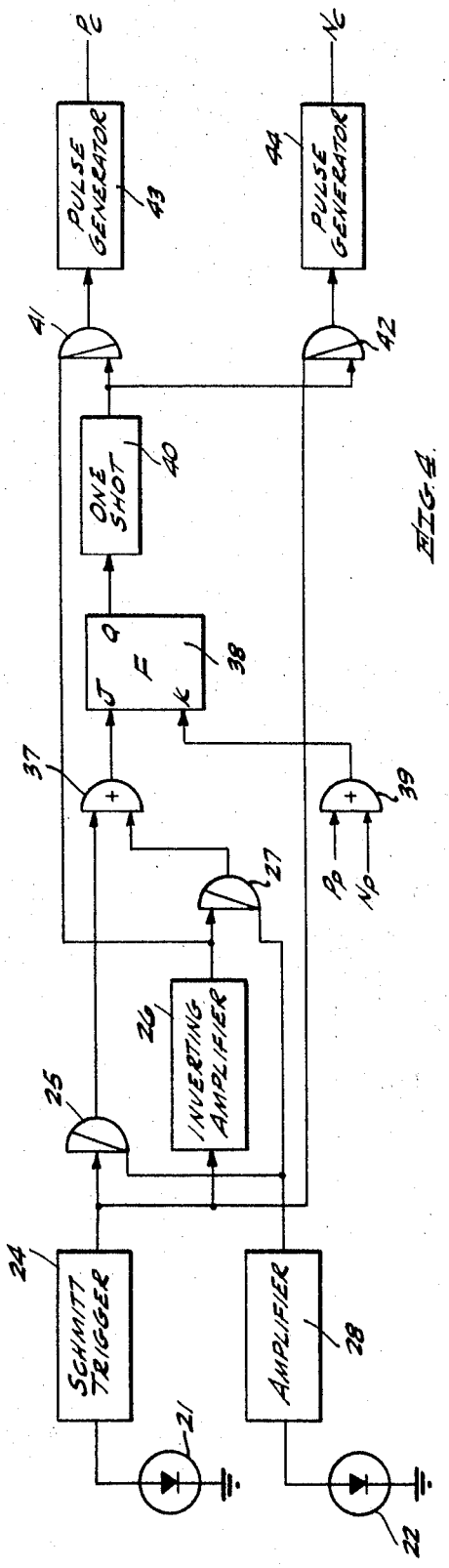

POSITIVE DIRECTION DISPLACEMENT

NEGATIVE DIRECTION DISPLACEMENT

POSITIONING SYSTEM

BACKGROUND OF THE INVENTION

Many devices such as machine tools, for example, have displacement measuring systems which utilize pulse counting techniques to determine displacement along an axis. Displacement along the axis could be measured by the rotation of a lead-screw drive mechanism, for example. The rotation of a pinion gear may also be used to measure displacement in a system using a rack and pinion drive mechanism, for example. Typically, these measuring systems will have a certain error due to nonlinearities in the basic positioning member of the positioning mechanism, for example, the lead screw or the rack, which may also be termed a measuring member. These nonlinearities may produce an actual displacement which is usually either consistently longer or consistently shorter than that measured by the measuring system. The actual displacement might also vary from shorter to longer, or vice versa, along the length of the measuring member.

There are various ways to reduce these errors in order to maintain the tolerance required of the complete system. One obvious way is to require small tolerance in the parts of the measuring system, particularly the measuring member in order that the total system error is within acceptable limits. This increases the cost of the overall system since more accurate machining of parts is required. In many applications economic considerations negate the use of precision parts. Another consideration is that as the particular machine is used the parts may wear and introduce errors into the measuring system. Where high precision is required errors resulting from worn parts or from not sufficiently accurate parts may be compensated using equipment embodying the principles of this invention.

SUMMARY OF THE INVENTION

The present invention provides improvements in prior art arrangements by providing an error correction system which may be calibrated to the particular machine after it is built. This reduces the cost of the original machine by allowing larger tolerances in the construction of the machine, particularly the measuring member of the positioning mechanism. The present invention can also be adapted to allow recalibration of the measuring system after the positioning mechanism has been worn due to use. In this way the useful life of the machine may be extended without replacement of parts.

These features inhere in one embodiment of the present invention which includes detection apparatus mounted along or adjacent to the path of movement of the movable member, which will generate correction signals whenever a correction should be introduced into the measuring system. Electronic circuitry senses the correction signal and produces an additive or subtractive correction pulse as required which is inserted into the measuring system counter.

More particularly, the desired result is accomplished by determining points along the path of movement at which corrections are to be made and at each such point providing an error indication which will activate two adjacent detection devices which generate signals, overlapping in time, which are coupled to suitable correction circuitry. The correction circuitry utilizes the sequence of occurrence of signals to determine the direction of movement of the moving member and thereby to distinguish the need for an additive or subtractive correction pulse. The correction circuitry will insert the correction pulse into the measuring system counter at a time when it will not interfere with the counting of the normal measuring pulses, for instance, in a position in time between successive count pulses.

DESCRIPTION OF THE DRAWINGS

The novel features and advantages of the invention will become more apparent from the following detailed description when taken in conjunction with the accompanying drawings in which:

FIG. 1 is a schematic block diagram generally illustrating the invention;

FIG. 2 schematically depicts a correction indicating and detecting arrangements which may be used with the invention;

FIG. 3 is a schematic diagram illustrating one circuit arrangement which may be used for the error correction circuitry;

FIG. 4 is a schematic diagram illustrating another circuit arrangement which may be used for the error correction circuitry;

DESCRIPTION OF THE PREFERRED EMBODIMENTS

Figure 5:
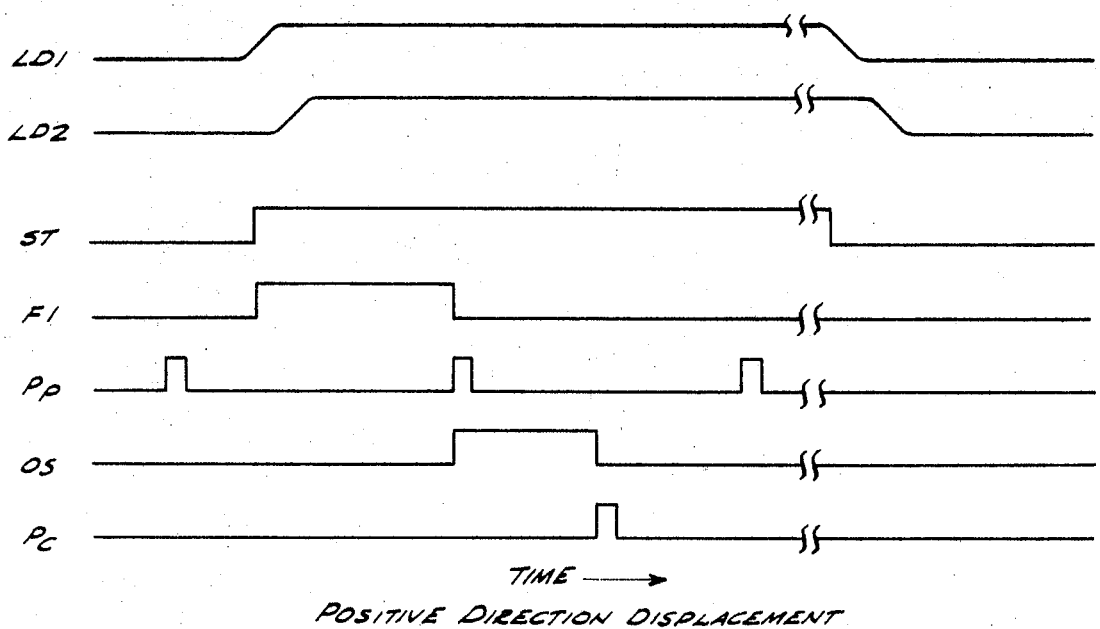
FIGS. 5 and 6 are timing diagrams of electrical signals produced by the error correction system.

With reference to FIG. 1, there is shown a moving member 1 which may be a machine tool table, for example. The moving member may be moved along a linear path by a positioning mechanism which may include a linear measuring member 2, which may be a lead screw, for example, powered by a motor M which is controlled by suitable motor control circuitry MC. Displacement of the moving member 1 along the path of movement may be determined by a suitable transducer system 3 coupled to and controlled by the linear measuring member 2 and which in turn signals a displacement detector system 4. The displacement detector system 4 is adapted to determine the direction of movement of the moving member 1 and to generate an additive measuring pulse $Pp$ or a subtractive measuring pulse $Np$ according to the direction of movement of moving member 1. The additive pulse $Pp$ is applied to a counter 5 through an OR gate 6 and causes the counter 5 to count up one count to indicate one increment of movement of the moving member 1 in an arbitrarily chosen positive direction. The subtractive pulse $Np$ is applied to the counter 5 through an OR gate 7 and causes the counter 5 to count down one count to indicate one increment of movement of the moving member 1 in the opposite direction. At any time the count in the counter 5 is indicative of the actual position of the moving member 1 along the linear measuring member 2.

One type of bidirectional counter which may be used is illustrated in FIG. 24 of U.S. Pat. No. 3,343,053 to E. J. Toscano et al., entitled "Selective Zero Electrical Control System" and assigned to the assignee of this invention. Any conventional counter capable of counting up in the presence of one train of count pulses and counting down in the presence of the other train of count pulses may be used.

Although pulses such as $Pp$ and $Np$ may be generated by any system for indicating increments of displacement of a member in respective arbitrarily chosen positive and negative directions, a specific system for generating such pulses is shown in block form in FIG. 3 of U.S. Pat. No. 3,262,105 to R. C. Bell, entitled "Condition Responsive Electrical System" and assigned to the assignee of this invention. Specific details of the system are shown in other figures of the patent. The patent to Bell uses a unidirectional counter, i.e., a count down type of counter as distinguished from a bidirectional counter. In such an arrangement a count indicative of a desired position is inserted in the count down counter and the pulses $Pp$ and $Np$ are used to count down the counter. Positioning begins when the counter is set with the desired count and closes at a predetermined minimum count of the counter including zero.

Since a linear measuring member, i.e., a screw or a rack, or the like, is a part of the positioning mechanism, the linear measuring member may furnish a direct indication of position to any suitable pickup unit and need not be specifically limited to that shown in the patent to Bell. Typical pickups include resolvers, INDUCTOSYN scales, ACCUPIN pickup devices, optical scales, magnetic scales, etc. The electrical outputs of these devices may be converted to a numerical count applicable to the circuits herein disclosed.

The teachings of the patent to Bell are extended in U.S. Pat. No. 3,353,161 to Toscano, entitled "Electrical Control System for Machine Tool Device with Overshoot Correction Feature" and assigned to the assignee of this invention. This system in FIG. 2 uses the unidirectional type of counter PC described by the patentee Bell and controls the input to the unidirectional counter by means of a small overshoot counter having two flip-flops FQ01 and FQ02. The overshoot counter is bidirectional in character. OR gates such as the OR gates 6 and 7 of FIG. 1 of this application may couple the pulses Pp and Np of the Toscano patent and pulses Pc and Nc of this application as inputs to gates AG18 and AG17 of FIG. 2 of the U.S. Pat. No. 3,353,161 to Toscano to apply the scale error correction feature of this invention.

The measuring system is calibrated by moving the moving member 1 along the path of the linear measuring member 2 and comparing the displacement indicated by the count in the counter 5 with the actual displacement determined by independent means. In this manner, points are determined along the path of movement of the moving member 1 at which a one pulse correction to the count in the counter 5 is required.

An error correction indicating apparatus 8 is placed adjacent to the moving member 1, and parallel to the axis of the linear measuring member 2 indicate the predetermined points along the path of movement of the moving member 1 at which one pulse correction to the count in the counter 5 is required. The error correction indicating apparatus 8 may be cams, magnets, or light interrupting shields or light reflecting material. An error correction detecting apparatus 9 is mounted on the moving member 1 and is positioned adjacent to the error correction indicating apparatus 8. The error correction detecting apparatus 9 may be cam operated switches, magnetic proximity switches, photoelectric detectors with an associated light source, or the like. The error correction indicating apparatus 8 will provide an indication at predetermined positions along the axis of the linear measuring member 2 where a one count correction is required. The error correction detecting apparatus 9 will provide error correction signals when a correction is required.

The error correction signals from the error correction detecting apparatus 9 are applied to a correction circuit 10 which is adapted to determine the direction of movement of the moving member 1 and which will generate an additive correction pulse Pc or a subtractive correction pulse Nc accordingly. The error correction circuit 10 is also adapted to insert the additive or subtractive correction pulse into the counter 5 through OR gate 6 or OR gate 7, respectively, at a time when it will not interfere with the normal counting of the measuring pulses Pp or Np. The details of two arrangements of the error correction circuit 10 are shown in FIGS. 3 and 4 and will be discussed in detail below.

FIG. 1 shows one type of error correction indicating and detecting apparatus that may be used with the present invention. Reflective spots 11 are placed along the bottom surface of the error correction indicating apparatus 8 at positions where a predetermined error correction is required. Light detectors 12 are positioned adjacent to each other on the error correction detecting apparatus 9. A light source 13 is mechanically coupled to the error correction detecting apparatus 9 and positioned to provide light energy which will be reflected by the reflective spots 11 onto the light detectors 12. The reflective spots 11 are of such size in relation to the position of the light detectors 12 to allow a distinguishable succession of light detector illumination. This is explained in more detail with reference to the arrangement shown in FIG. 2.

FIG. 2 shows another type of error correction indicating and detecting apparatus that may be used with the present invention. A light source 20 and a first light detector 21 and a second light detector 22 are mounted on the moving member 1. A light shield 23 is disposed between the light source 20 and the first and second light detectors 21 and 22, respectively, and is positioned in fixed relationship with the linear measuring member 2. The light shield 23 has perforations 23a at positions where predetermined corrections are required. The perforations are of such size in relation to the position of the first and second light detectors 21 and 22 so that for one direction of motion the first light detector 21 is illuminated before the second light detector 22, then both are illuminated, then the first light detector 21 goes dark while the second light detector 22 is still illuminated, then the second light detector 22 goes dark before another correction perforation starts the process over. The order of illumination of the first and second light detectors 21 and 22 will be reversed by movement of the moving member 1 in the opposite direction. For either direction of movement, the change of state of the output of the first light detector 21 which occurs when the second light detector 22 is dark will be used to generate a correction pulse.

The correction pulse is additive when the moving member 1 is traveling in one direction, arbitrarily designated as positive, and is subtractive when the moving member is traveling in the opposite direction. An additive correction is determined, for example, by the illumination of the first light detector 21 going from dark to light, while the second light detector 22 is dark. A subtractive correction will be determined, for example, by the illumination of the first light detector 21 going from light to dark, while the second light detector 22 is dark. The change of illumination of the first light detector 21 which takes place while the second light detector 22 is illuminated will be ignored by the error correction circuitry.

The correction afforded by the system described is all additive in one direction and all subtractive in the opposite direction. This is adequate for a system which has a measuring member which is consistently short or consistent long. In any cases where the measuring member is alternatively short and long in one direction of movement, a double arrangement may be used with one set of detectors providing for additive corrections and a second set of detectors providing for subtractive corrections.

Throughout the following detailed description of the invention, unless otherwise noted, it will be assumed that the measuring member is consistently long so that the actual displacement in the arbitrarily assigned positive direction will be more than indicated by the measuring system. For this condition an error correction indication is required to add a correction pulse for positive direction of displacement and subtract a correction pulse for negative direction of displacement.

FIG. 3 shows one circuit arrangement which may be used to detect the need for a correction and generate a correction pulse. The first light detector 21 is connected to the input of a Schmitt trigger 24 which will provide an output signal during the time that the first light detector 21 is illuminated. The Schmitt trigger is used to provide required wave shapes for triggering the flip-flops in the circuitry. The Schmitt trigger output is applied to the signal input of a first pulse inhibit gate 25 and to an inverting amplifier 26. The output of the inverting amplifier 26 is applied to the signal input of a second pulse inhibit gate 27.

The output of the second light detector 22 is applied to a noninverting amplifier 28. The output of the amplifier 28 is applied to the inhibit input of the first pulse inhibit gate 25 and to the inhibit input of the second pulse inhibit gate 27. The pulse inhibit gates are adapted to allow a rising edge input signal through the gate without change when there is no signal on the inhibit line of the gate. If there is an input signal on the inhibit line no signal is allowed through the gate and the output remains at the quiescent level. Removal of the signal on the inhibit input of the pulse inhibit gates while there is a signal on the signal input of the gates does not affect the output of the gate. One type of circuit which may be used for the pulse inhibit gates in shown and described in the above referenced patent to Bell. The circuit is depicted in FIG. 10 and described in columns 12 and 13 of the referenced patent and therein referred to as a count gate.

The output of the first pulse inhibit gate 25 is connected to the set input of a first flip-flop 29. When there is an output pulse from the first pulse inhibit gate 25 the first flip-flop 29 will be set and the set output of the first flip-flop 29 will go the logical "true" indicating voltage level. Incremental displacement signals Pp and Np are applied to the reset input of the first flip-flop 29 through an OR gate 30 to reset the first flip-flop 29 on the occurrence of a count up pulse Pp or a count down pulse Np. The set output of the first flip-flop 29 is connected to a first one-shot multivibrator 31 which is adapted to trigger on the falling edge of the flip-flop output. The output of the first one-shot multivibrator 31 is connected to a first pulse generating circuit 32 which will generate a pulse on the falling trailing edge of the output of the one-shot multivibrator 31. The pulse generating circuit may be a capacitance coupled amplifier, for example. The pulse output of the first pulse generating circuit 32 is applied to the count up input of the counter 5 through the OR gate 6 shown in FIG. 1.

The output of the second pulse inhibit gate 27 is connected to the set input of a second flip-flop 33. When there is an output pulse from the second pulse inhibit gate 27 the second flip-flop 33 will be set and the set output of the second flip-flop 33 will go to the logical "true" indicating voltage level. Incremental displacement signals Pp and Np are applied to the reset input of the second flip-flop 33 through an OR gate 34 to reset the second flip-flop 33 on the occurrence of a count up pulse Pp or a count down pulse Np. The set output of the second flip-flop 33 is connected to a second one-shot multivibrator 35 which is adapted to trigger on the falling trailing edge of the flip-flop output. The output of the second one-shot multivibrator 35 is connected to a second pulse generating circuit 36 which will generate a pulse on the falling trailing edge of the output of the one-shot multivibrator 35. The pulse output of the second pulse generating circuit 36 is applied to the count down input of the counter 5 through the OR gate 7 shown in FIG. 1.

Figure 6:
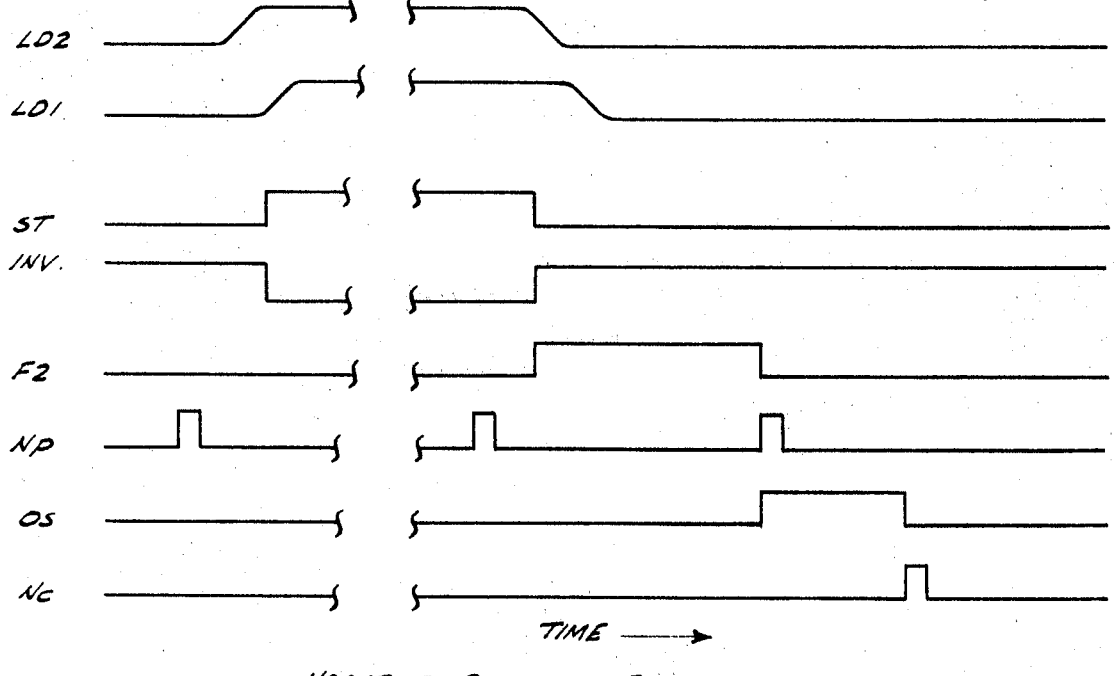

Now the operation of the error correction system will be described with reference to the timing diagrams of FIGS. 5 and 6. First assume that the moving member 1 is being displaced in the arbitrarily chosen positive direction. FIG. 5 shows the signal timing for this case. As the moving member 1 is being displaced in the positive direction, the displacement detector system 4 will generate additive measuring pulses Pp at regular intervals which will be applied through OR gate 6 to the count up input of the counter 5. These pulses are shown as waveform Pp in FIG. 5.

A perforation will have been placed in the light shield 23 in a position where a predetermined correction is required. As the moving member 1 approaches this position, light from the light source 20 goes through the perforation and strikes the first light detector 21 which will generate an output signal shown as waveform LD1. The output signal from the first light detector 21 will cause the Schmitt trigger to generate an output shown as waveform ST. At this time the second light detector 22 has not been illuminated and therefore there is no output form amplifier 28 to inhibit the pulse inhibit gates 25 and 27. The rising edge of the Schmitt trigger output passes through the first pulse inhibit gate 25 and will set the first flip-flop 29. The set output of the first flip-flop 29 is shown in FIG. 5 as waveform F1. The Schmitt trigger output is applied to the pulse inhibit gate 27 through the inverting amplifier and therefore the input to the gate 27 will be a falling edge which will not be passed through the gate 27, even though there is no inhibit signal on the gate 27 since the pulse inhibit gates are only sensitive to a rising edge on the signal input.

As the moving member 1 continues to move, the second light detector 22 will be illuminated while the first light detector 21 remains illuminated. The output of the second light detector 22, shown as waveform LD2 in FIG. 5, is applied through the amplifier 28 to the inhibit inputs of pulse inhibit gates 25 and 27. When the moving member 1 moves further, the first light detector will no longer be illuminated and the output of the Schmitt trigger will return to its quiescent level.

The falling edge of the Schmitt trigger output will not be passed through the first pulse inhibit gate 25 since the gate is only responsive to a rising edge. Inverting amplifier 26 will invert the signal and apply a rising edge to the signal input of pulse inhibit gate 27. This rising edge would normally pass through the gate 27, except for the signal from the second light detector which remains on the inhibit input of the gate. Therefore, no signal originated by the falling edge of the Schmitt trigger output will be passed by the pulse inhibit gates. As the moving member 1 continues to move the second light detector 22 will go dark and the inhibit signals will be removed from the gates 25 and 27.

Recalling that the first flip-flop 29 has been set as described above, when the next regular additive measuring pulse Pp is generated by the displacement detector system, it will reset the first flip-flop 29. The falling edge of the set output of the first flip-flop 29 will trigger the first one-shot multivibrator 31 as shown by the waveform labeled OS in FIG. 5. The first one-shot multivibrator 31 will be adjusted to have a time delay of approximately one-half the normal time internal between the additive measuring pulses Pp. When the first one-shot multivibrator 31 turns off, the first pulse generating circuit 32 will generate an additive correction pulse Pc which is applied to the count up input of the counter 5 through the OR gate 6. The circuitry that generates the counting pulses Pp is such that a definite minimum time interval $\tau$ will elapse between pulses. The one-shot multivibrator timing is adjusted to be approximately $\tau/2$. In that manner the correction pulse which takes place when the one-shot multivibrator times out will occur before the next counting pulse Pp. *In other words, the timing provided by the one-shot multivibrator 31 prevents the correction pulse Pc from being applied to the counter 5 at the same time as a measuring pulse Pp which ensures that the counter will record every correction pulse.*

Now assume that the moving member 1 is being displaced in the negative direction. FIG. 6 shows the signal timing for this case. As the moving member 1 is being displaced in the negative direction the displacement detector system 4 will generate subtractive measuring pulses Np at regular intervals which will be applied through OR gate 7 to the count down input of the counter 5. These pulses are shown as waveform Np in FIG. 6. As the moving member 1 approaches the perforation in the light shield 23, which will be the same perforation which caused an additive correction pulse when moving in the positive direction, light from the light source 20 passes through the perforation and strikes the second light detector 22 which will generate an output signal that is shown as waveform LD2 in FIG. 6. This signal will apply an inhibit input to gates 25 and 27 through amplifier 28.

As the moving member 1 continues to move in the negative direction, the first light detector 21 will be illuminated while the second light detector remains illuminated. The output of the first light detector 21, shown as waveform LD1 on FIG. 6, is applied to the Schmitt trigger 24 as before. The rising edge output of the Schmitt trigger 24, shown as waveform ST, is prevented from passing through the first pulse inhibit gate 25 by the presence of the inhibit signal. The inverted Schmitt trigger signal from inverting amplifier 26, shown as waveform INV, will not pass through the second pulse inhibit gate 27 because the gate is only responsive to a positive going voltage level and because there is an inhibit signal applied to the gate.

As the moving member 1 moves further along in the negative direction, the second light detector 22 will go dark and the inhibit signal will be removed from pulse inhibit gates 25 and 27. Now when he first light detector goes dark, the Schmitt trigger output will be a falling edge which will have no effect on the first pulse inhibit gate 25. However, the inverted Schmitt trigger output from inverting amplifier 26 will be a rising edge which is passed through gate 27 to set the second flip-flop 33. The output of the second flip-flop 33 is shown as waveform F2. The remaining sequence of operations for the second flip-flop 33, OR gate 34, the second one-shot 35, and the second pulse generating circuit 36 is exactly the same as that described above for flip-flop 29, OR gate 30, one-shot 31, and pulse generating circuit 32 and will not be further described here. The output of the second pulse generating circuit 36 will be a subtractive correction pulse Nc which is applied to the count down input of the counter 5 through the OR gate 7.

FIG. 4 shows a modified circuit arrangement which may be used with the present invention. The light detectors 21 and 22, the Schmitt trigger 24, the amplifier 28, the inverting amplifier 26, and the pulse inhibit gates 25 and 27 are connected and operate in exactly the same manner as described above for the circuit of FIG. 3. The outputs of the pulse inhibit gates 25 and 27 are connected through an OR gate 37 to the set input of a flip-flop 38 to set the flip-flop on the occurrence of an output from either gate 25 or gate 27, that is, whenever an additive or a subtractive correction is required. Additive and subtractive measuring pulses pp and Np, respectively, are applied through an OR gate 39 to the reset input of the flip-flop 38 to reset the flip-flop on the occurrence of the next regular measuring pulse. The set output of the flip-flop 38 is connected to a one-shot multivibrator 40 which triggers on the falling edge of the flip-flop output when the flip-flop is reset.

The output of the one-shot multivibrator 40 is applied to the signal inputs of pulse inhibit gates 41 and 42. Pulse inhibit gates 41 and 42 differ in operation from the pulse inhibit gates 25 and 27, previously described, in that gates 41 and 42 are sensitive only to a falling edge signal on the signal input of the gates. Thus, gates 41 and 42 will not pass the rising edge output of the one-shot multivibrator 40 when the one-shot is first turned on, regardless of the state of the inhibit inputs of the gates 41 and 42. One type of circuit which may be used for the gates 41 and 42 is illustrated and described with reference to FIG. 7 in copending application Ser. No. 560,294, entitled "Reversible Electronic Digital Counter" by E. J. Toscano and assigned to the assignee of this invention.

The output of the Schmitt trigger 24 is applied to the inhibit input of gate 42 and the inverted output of the Schmitt trigger 24 taken from the inverting amplifier 26 is applied to the inhibit input of gate 41. The output of gate 41 is applied to a pulse generating circuit 43 which will generate an additive correction pulse Pc. The output of gate 42 is applied to a pulse generating circuit 44 which will generate a subtractive correction pulse Nc. The pulse generating circuits 43 and 44 may be of the same type as described above for the circuit of FIG. 3. FIGS. 5 and 6, previously described, also show the timing for the circuit of FIG. 4.

When the moving member 1 is being displaced in the positive direction and a condition exists in which the actual displacement exceeds the generated count any error indication should generate an additive correction pulse Pc. As shown by FIG. 5, the Schmitt trigger 24 output is in the true state during the time that the one-shot turns off. The Schmitt trigger output inhibits gate 42 from applying a signal to the pulse generating circuit 44. However, there is no inhibit signal applied to gate 41 and a signal will be applied to the pulse generating circuit 43 and an additive correction pulse Pc will be generated.

Conversely, for the condition stated, when the moving member 1 is being displaced in the negative direction any error indication should generate a subtractive correction pulse Nc. As shown by FIG. 6 the inverting amplifier 26 output is in the true state during the time that the one-shot multivibrator turns off. The inverting amplifier output inhibits the gate 41 from applying a signal to the pulse generating circuit 43. However, in this case there is no inhibit signal applied to the gate 42 and a signal will be applied to the pulse generating circuit 44 and a subtractive correction pulse Nc will be generated.

It is apparent from the description of the circuit of FIG. 4 that for positive direction of displacement (see FIG. 5) the signal from the Schmitt trigger must be on for approximately twice the time interval between normal measuring pulses Pp to allow proper gating of signals to the pulse generating circuits. This will not be a problem with any practical system. In one typical system using the present invention the time interval between the normal measuring pulses Pp and Np is about 100 microseconds which represents a displacement of one one-thousandths of an inch. The error corrections are typically required at no closer than several tenths of an inch. The error indicating device is adapted to provide illumination of the light detectors for more than one-tenth of an inch of movement of the moving member. Therefore, the Schmitt trigger signal will be on for a time which will allow over 100 measuring pulses to be generated. Similarly, for negative direction of displacement (see FIG. 6) the Schmitt trigger signal must be on for approximately twice the time interval between the normal measuring pulses Np before another error indication is detected. As previously noted, however, the error indications will be no closer than several tenths of an inch, which will allow several hundred measuring pulses to be generated before another correction is required.

As noted above, the previous description assumes that the measuring member is consistently long so that the actual displacement in the positive direction will be more than that indicated by the pulse count. If the measuring member is consistently short so that the actual displacement in the positive direction will be less than that indicated by the pulse count, it is apparent that the pulse outputs Pc and Nc from the correction circuitry 10 should be applied to the opposite counter inputs from those shown in FIG. 1. That is, the Pc output from the correction circuitry 10 should be applied to the count down input of the counter 5 through the OR gate 7 and the Nc output should be applied to the count up input of the counter 5 through the OR gate 6.

Although specific embodiments of this invention have been describe, it will be appreciated that other arrangements of this invention may be devised without departing from the spirit and scope hereof. Any type of error indicating transducer may be used with the invention. It is also apparent that numerous arrangements of the error correction circuitry may be devised depending on the types of standard circuits available. The error correction circuitry described is for a system which does not use system timing clock pulse signals. Other circuitry making use of such timing signals may be devised. These and other obvious detail changes are believed to be within the capabilities of those skilled in the art.

What I claim is:

1. In a positioning system having count pulses applied to a counter, the pulse count in said counter indicating position of a moving member along a given path, an error correction system comprising:

a plurality of correction indication means, each of said correction indication means disposed at a predetermined position along said given path where a one pulse count correction of said counter is required;

detecting means for detecting each of said correction indication means and for generating a pair of correction signals in response to each of said correction indication means, the time relationship of the signals in each pair of correction signals being indicative of the direction of movement of said moving member;

circuit means for receiving each pair of correction signals, said circuit means generating one correction pulse in response to each pair of correction signals, said correction pulse being additive when said moving member is moving in one direction and being subtractive when said moving member is moving in the opposite direction;

and means for applying each correction pulse to said counter to correct its pulse count.

2. An error correction system as claimed in claim 1 wherein said correction pulse is applied to said counter at a time other than when said count pulses are being applied to said counter.

3. An error correction system as claimed in claim 1 wherein said correction indication means comprises:

light interrupting means having light admitting perforations therein at said predetermined positions;
and a light source.

4. An error correction system as claimed in claim 1 where said correction indication means comprises:
light reflective means disposed at said predetermined positions;
and a light source.

5. An error correction system as claimed in claim 3 wherein said detecting means comprises:
light sensitive photocells.

6. An error correction system as claimed in claim 4 wherein said detecting means comprises:
light sensitive photocells.

7. An error correction system for introducing predetermined corrections into a position measuring system, said position measuring system adding counts to a counter to indicate movement of a moving member in one direction along a given path and subtracting counts from said counter to indicate movement of said moving member in the opposite direction, the number of counts in said counter being indicative of the position of said moving member along said given path, said error correction system comprising:
indicating means providing an indication at predetermined positions along said given path at which a correction is required;
a first detector to detect the indication provided by said indicating means and to generate a first signal in response thereto;
a second detector positioned adjacent to said first detector to detect the indication provided by said indicating means and to generate a second signal in response thereto, said second signal being spaced in time relationship from said first signal;
circuit means coupled to said first and second detectors for receiving said first and second signals, said circuit means being responsive to said time relationship of said first and second signals to determine the direction of movement of said moving member, said circuit means generating an additive correction pulse when said moving member is moving in said one direction and a subtractive correction pulse when said moving member is moving in said opposite direction;
and means coupled to said circuit means and to said counter for applying to said counter whichever of said additive correction pulse or said subtractive correction pulse is generated, said additive correction pulse causing one count to be added to said counter and said subtractive correction pulse causing one count to be subtracted from said counter.

8. An error correction system for introducing predetermined corrections into a position measuring system, said position measuring system adding counts to a counter to indicate movement of a moving member in one direction along a given path and subtracting counts from said counter to indicate movement of said moving member in the opposite direction, the number of counts in said counter being indicative of the position of said moving member along said given path, said error correction system comprising:
indicating means providing an indication at predetermined positions along said given path at which a correction is required;
a first detector to detect the indication provided by said indicating means and to generate a first signal in response thereto;
a second detector positioned adjacent to said first detector to detect the indication provided by said indicating means and to generate a second signal in response thereto, said second signal being spaced in time relationship from said first signal;
circuit means coupled to said first and second detectors for receiving said first and second signals, said circuit means being responsive to said time relationship of said first and second signals to determine the direction of movement of said moving member, said circuit means generating an additive correction pulse when said moving member is moving in said one direction and a subtractive correction pulse when said moving member is moving in said opposite direction;
and means coupled to said circuit means and to said counter for applying to said counter whichever of said additive correction pulse or said subtractive correction pulse is generated, said additive correction pulse causing one count to be subtracted from said counter and said subtractive correction pulse causing one count to be added to said counter.

9. In a positioning system having a positioning mechanism for moving a member along a given path and including a count generator for generating a count signal for each increment of movement of an element of said positioning mechanism and in which the physical incremental displacement of said member by said mechanism is consistently in error with he number of count signals generated when said member is at a predetermined point along said path, an error correction system which comprises:
error correction generating means having a first element disposed along said path of movement near said predetermined point and having a second element adapted to be coupled to said positioning mechanism for movement with said member along said path for generating an error correction signal when said elements are in proximity;
counter means adapted to be coupled to said count signal generator for receiving said count signals;
and timing means responsive to said count signal and to said error correction signal for coupling an error correction signal to said counter means intermediate successive count signals